(12) United States Patent
Matsuno et al.

(10) Patent No.: US 9,889,875 B2
(45) Date of Patent: Feb. 13, 2018

(54) STEERING COLUMN DEVICE

(71) Applicant: FUJI KIKO CO., LTD., Kosai-shi, Shizuoka (JP)

(72) Inventors: Mitsuyoshi Matsuno, Kosai (JP); Koji Sawamura, Kosai (JP); Masatoshi Sakamoto, Toyohashi (JP); Aya Shimada, Hamamatsu (JP); Reo Katakura, Hamamatsu (JP); Tadao Ito, Toyohashi (JP)

(73) Assignee: FUJI KIKO CO., LTD., Kosai-shi (JP)

( * ) Notice: Subject to any disclaimer, the term of this patent is extended or adjusted under 35 U.S.C. 154(b) by 0 days.

(21) Appl. No.: 15/453,015

(22) Filed: Mar. 8, 2017

(65) Prior Publication Data
US 2017/0282957 A1    Oct. 5, 2017

(30) Foreign Application Priority Data

Mar. 31, 2016  (JP) .................................. 2016-072579

(51) Int. Cl.
*B62D 1/16* (2006.01)
*B62D 1/184* (2006.01)
*B62D 1/187* (2006.01)

(52) U.S. Cl.
CPC ............. *B62D 1/184* (2013.01); *B62D 1/187* (2013.01)

(58) Field of Classification Search
CPC ........................... B62D 1/184; Y10T 70/5956
USPC .................... 280/775, 776, 777; 74/492, 493
See application file for complete search history.

(56) References Cited

U.S. PATENT DOCUMENTS

| | | | | |
|---|---|---|---|---|
| 6,139,057 A * | 10/2000 | Olgren | ................... | B62D 1/184 280/775 |
| 6,419,269 B1 * | 7/2002 | Manwaring | ............ | B62D 1/184 280/775 |
| 7,533,594 B2 * | 5/2009 | Menjak | .................. | B62D 1/184 280/775 |
| 7,685,903 B2 * | 3/2010 | Streng | .................... | B62D 1/184 74/492 |
| 7,954,852 B2 * | 6/2011 | Ueno | ....................... | B62D 1/16 280/775 |

(Continued)

FOREIGN PATENT DOCUMENTS

| JP | 2008-143396 A | 6/2008 |
|---|---|---|
| JP | 4567040 B2 | 10/2010 |
| KR | 10-2016-0017199 A | 2/2016 |

OTHER PUBLICATIONS

U.S. Appl. No. 15/453,026, filed Mar. 8, 2017, Fuji Kiko Co., Ltd.
European Search Report, dated Aug. 29, 2017, 10 pages.

*Primary Examiner* — Toan To
(74) *Attorney, Agent, or Firm* — Foley & Lardner LLP

(57) ABSTRACT

A steering column device includes: a steering shaft; a steering column; a vehicle body mounting bracket; one of the pair of the clamping pieces including a slit which has a substantially U-shape, and which surrounds one of a front side and a rear side of the tilt hole, and an upper side and a lower side of the tilt hole, and a tongue piece portion which is surrounded by the slit, the tilt hole being positioned at a tip end side of the tongue piece portion, and at least the one of the clamping pieces including the slit, including a reinforcement portion which surrounds an outside of the slit, and which is integrally provided with the one of the clamping pieces including the slit.

5 Claims, 9 Drawing Sheets

(56) References Cited

U.S. PATENT DOCUMENTS

| | | | |
|---|---|---|---|
| 2006/0021460 A1* | 2/2006 | Schulz | B62D 1/184 74/493 |
| 2006/0207379 A1* | 9/2006 | Riefe | B62D 1/184 74/492 |
| 2009/0066070 A1 | 3/2009 | Ueno et al. | |

* cited by examiner

_US 9,889,875 B2_

STEERING COLUMN DEVICE

BACKGROUND OF THE INVENTION

The present invention relates to a steering column device arranged to perform a tilt adjustment of a steering wheel.

A steering column device mounted on a vehicle has a function to adjust a position of a steering wheel in a tilt direction (upward and downward directions) in accordance with a body build (physical constitution) of a driver.

Japanese Patent Application Publication No. 2008-143396 discloses a tilt adjustment structure including an outer column arranged to rotatably support a steering shaft; a vehicle body mounting bracket including a pair of left and right side plates which sandwich left and right side surfaces of the outer column; a tightening rod penetrating through tilt elongated grooves formed in the pair of the side plates, and the outer column; and a nut arranged to tighten the outer column by the tightening rod and the pair of the side plates.

In this patent document, elongated through holes are provided on both sides and an upper side of the tilt elongated groove formed in the side plates, for decreasing the tightening operation force when the outer column is clamped by the pair of the side plates, so as to elastically vary the shapes of these side plates.

SUMMARY OF THE INVENTION

However, in the above-described patent document, the tightening operation force when the outer column is clamped by the pair of the side plates is varied in accordance with the tilt position. That is, a rigidity of a portion around the tilt elongated groove is varied in accordance with the tilt position. Accordingly, the operation force when the outer column is clamped by the pair of the side plates is varied in accordance with the tilt position.

It is, therefore, an object of the present invention to provide a steering column device devised to improve a support rigidity, to relatively decrease an operation force when a lock mechanism is operated, and not to vary the operation force in accordance with a tilt position.

According to one aspect of the present invention, a steering column device includes: a steering shaft; a steering column arranged to rotatably support the steering shaft; a vehicle body mounting bracket arranged to rotatably support the steering column to be swung in upward and downward directions of a vehicle about a tilt shaft of a swing center which is provided to a front end portion of the steering column; a pair of clamping pieces which are integrally provided to the vehicle body mounting bracket, and which are disposed to sandwich the steering column from both sides of the steering column on a rear end portion of the steering column; tilt holes each of which is formed in one of the clamping pieces, and each of which has an arc shape around the tilt shaft; a clamping shaft penetrating through the tilt holes and the steering column; and a lock mechanism provided to one end portion of the clamping shaft, and arranged to tighten and engage the steering column by the pair of the clamping pieces, one of the pair of the clamping pieces including a slit which has a substantially U-shape, and which surrounds one of a front side and a rear side of the tilt hole, and an upper side and a lower side of the tilt hole, and a tongue piece portion which is surrounded by the slit, the tilt hole being positioned at a tip end side of the tongue piece portion, and at least the one of the clamping pieces including the slit, including a reinforcement portion which surrounds an outside of the slit, and which is integrally provided with the one of the clamping pieces including the slit.

BRIEF DESCRIPTION OF THE DRAWINGS

FIG. 9A is a plan view. FIG. 9B is a front view of FIG. 9A. FIG. 9C is a left side view of FIG. 9B.

DETAILED DESCRIPTION OF THE INVENTION

FIGS. 1 to 11 shows a steering column device according to one embodiment of the present invention, which is arranged to perform a tilt operation and a telescopic operation.

Figure 1:
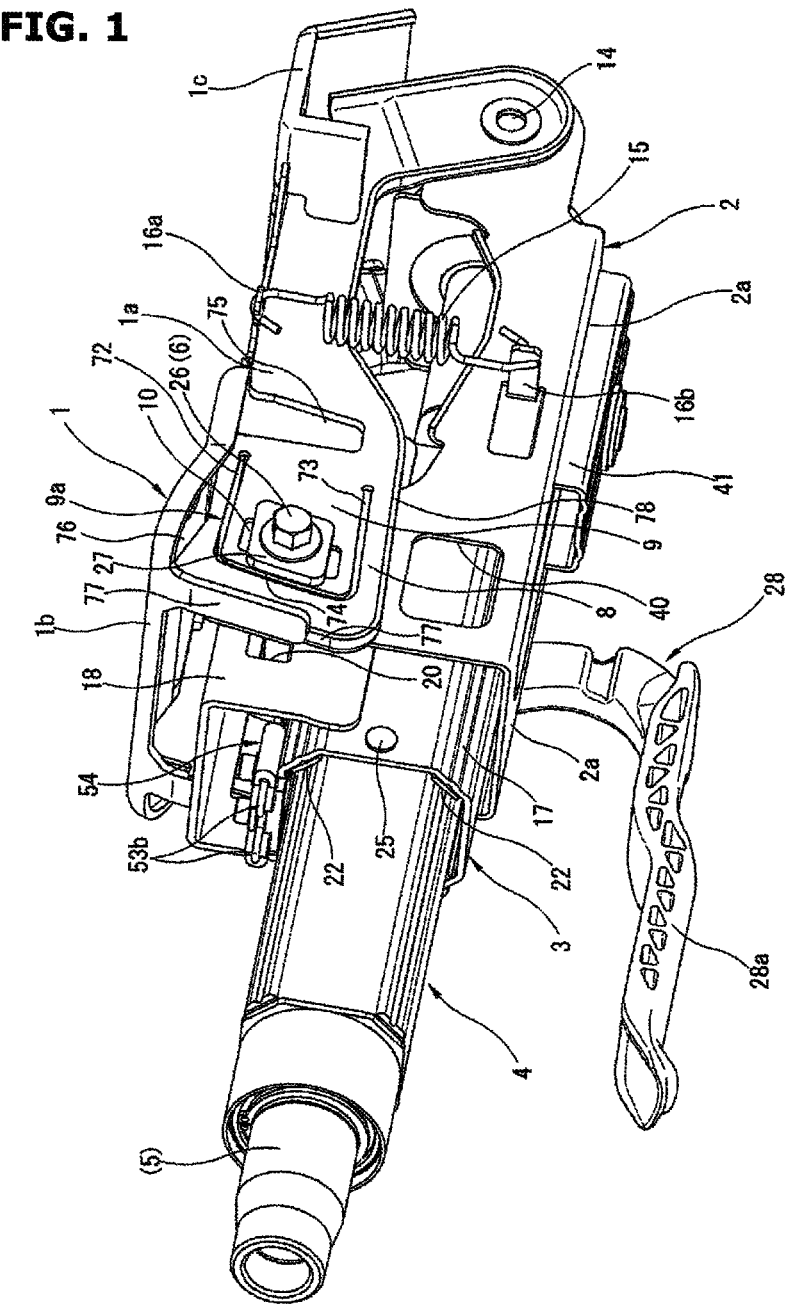
FIG. 1 is a perspective view showing an entire configuration of a steering column device according to the present invention.
Figure 2:
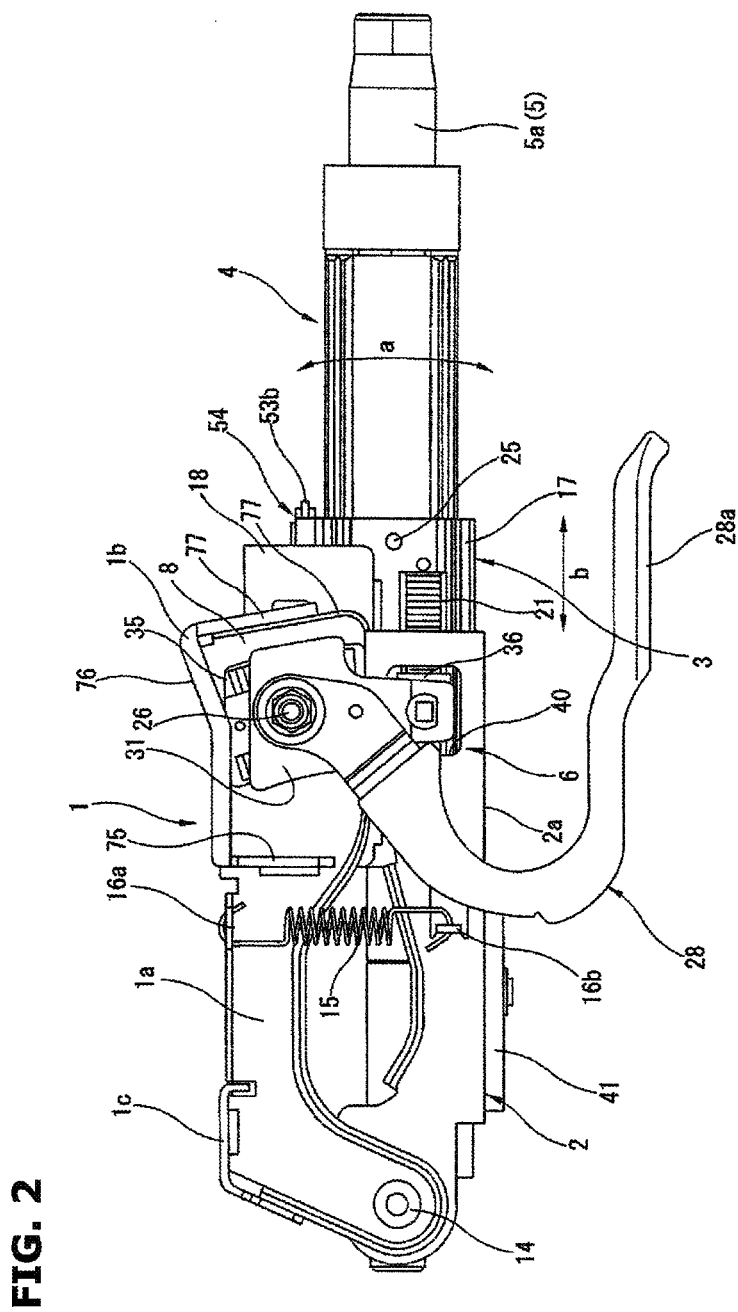
FIG. 2 is a side explanation view showing a left side of the steering column device of FIG. 1.
Figure 3:
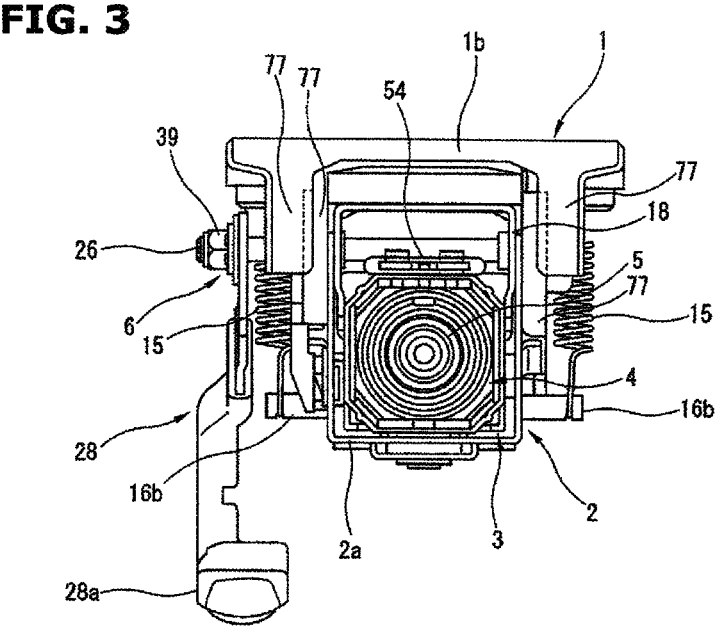
FIG. 3 is a front explanation view showing the steering column device of FIG. 1.
Figure 4:
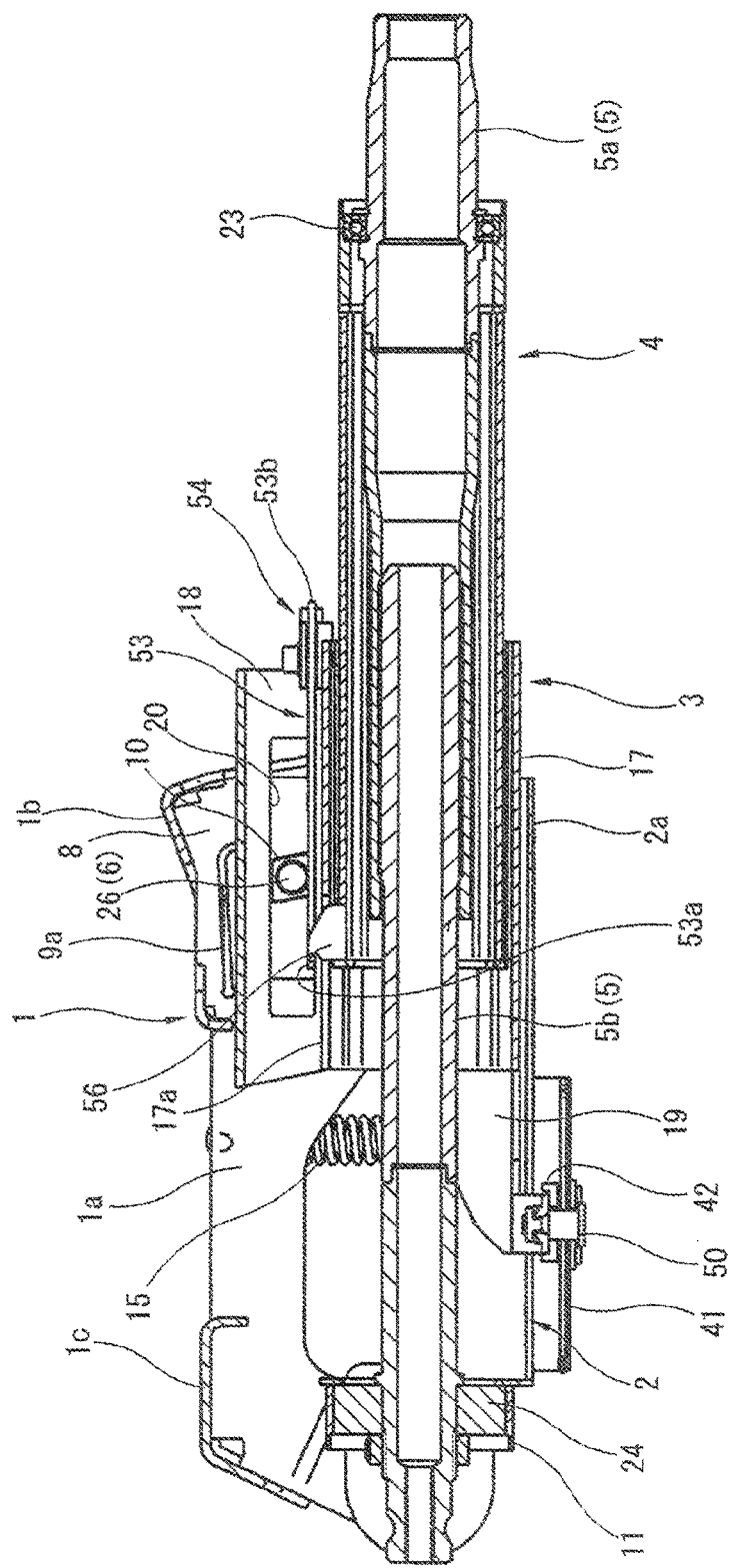
FIG. 4 is a sectional explanation view showing the entire configuration of FIG. 2.
Figure 5:
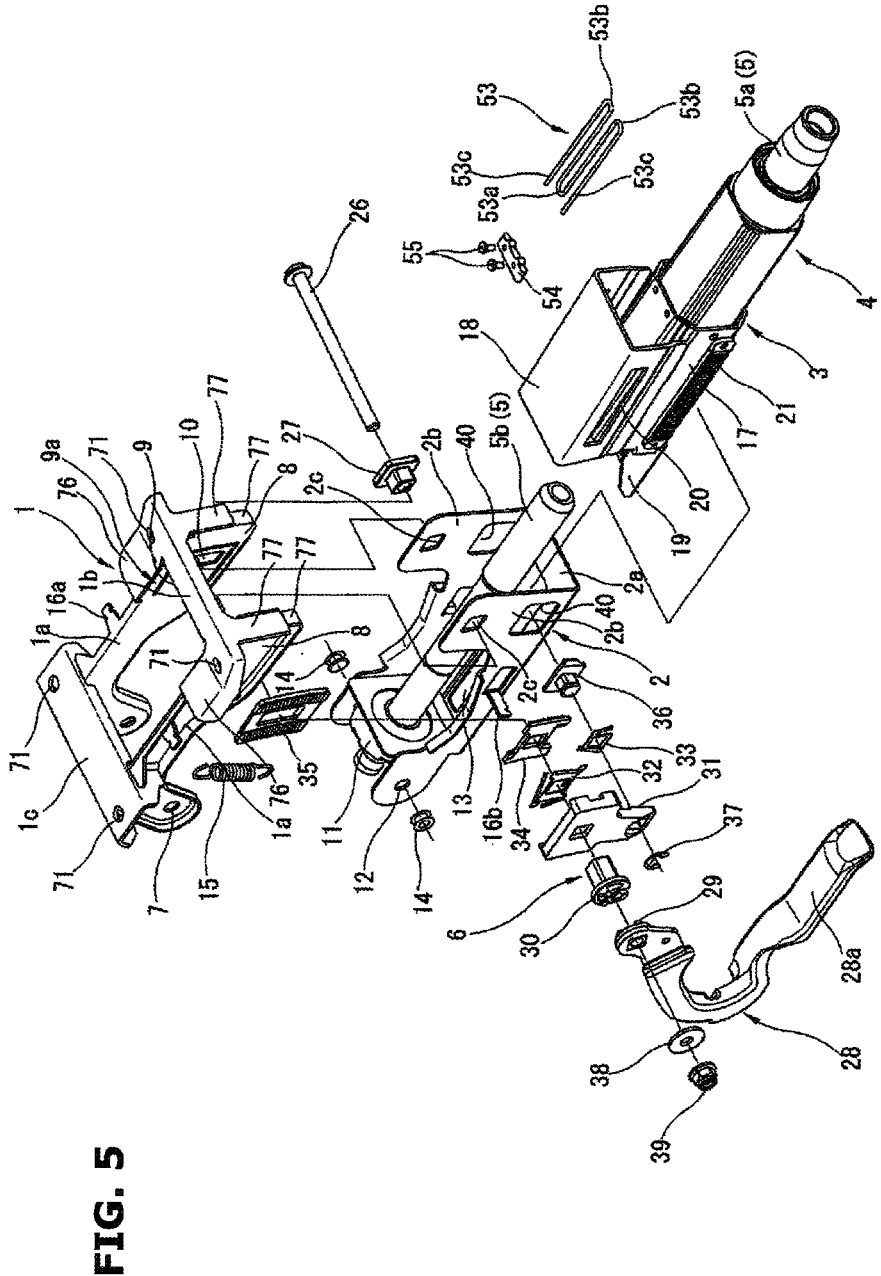
FIG. 5 is an exploded perspective view showing a main part of the steering column device of FIG. 1.
Figure 6:
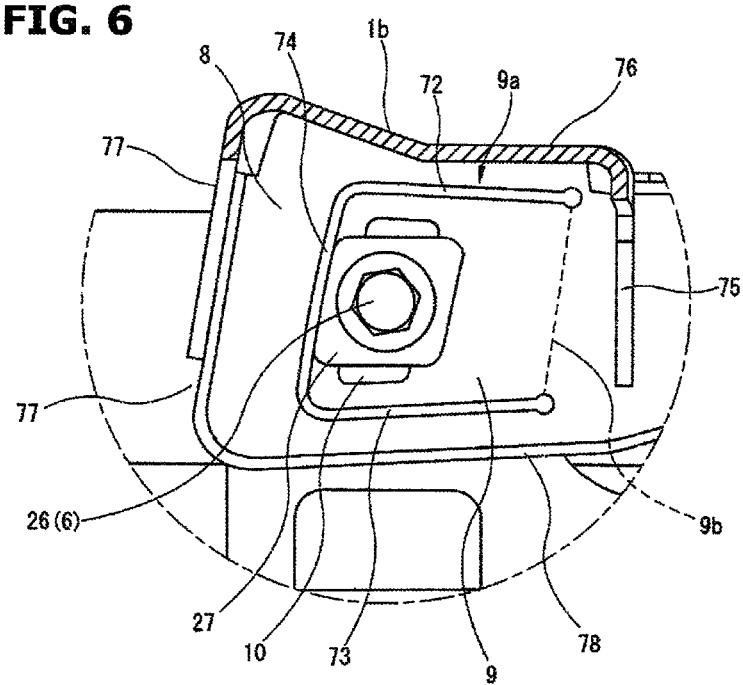
FIG. 6 is an explanation view showing an enlarged main part of a right side surface of the steering column device of FIG. 1.

FIG. 1 shows a perspective view showing an overall configuration of the steering column device. FIG. 2 is a side explanation view showing a left side of the steering column device shown in FIG. 1. FIG. 3 is a front explanation view showing the steering column device shown in FIG. 1. FIG. 4 is an overall sectional explanation view showing the steering column device shown in FIG. 2. FIG. 5 is an exploded perspective view showing constituting components of the steering column device shown in FIG. 1. Moreover, FIG. 6 is an enlarged explanation view showing main parts of a right side of the steering column device shown in FIG. 1. Besides, in below explanations, a "front side", a "rear side", a "front end", a "rear end", "forward and rearward directions", "upward and downward directions", and so on are based on directions in a state where the steering column device is mounted on a vehicle. For example, the "front side" corresponds to a front side of the vehicle.

As shown in FIG. 1 to FIG. 5, the steering column device includes a vehicle body mounting bracket (hereinafter, referred to as "mounting bracket" 1 which is made of a metal plate, and which serves as a mounting member for mounting the steering column device to the vehicle body; a tilt bracket 2 which is made of a metal plate, and which is supported on the mounting bracket 1 to be operated to be swung (to adjust the tilt position) in the upward and downward directions (in a direction shown by an arrow a in FIG. 2) with respect to the mounting bracket 1 about a tilt hinge pin 14 (tilt shaft) disposed on the front end portion side of the mounting bracket 1; a middle jacket 3 which is formed from a metal into a cylindrical shape, and which is supported on the tilt bracket 2 to be slid (to adjust a telescope position) in the forward and rearward directions (in a direction shown by an arrow b in FIG. 2) with respect to the tilt bracket 2; an upper jacket 4 which is made from a metal into a cylindrical shape, which is inserted into the middle jacket 3, and which is supported on the middle jacket 3 to be slid in an axial direction relative to the middle jacket 3; a steering shaft 5 which is inserted into the upper jacket 4, and which is arranged to be rotatably supported on the upper jacket 4; and a lock mechanism 6 arranged to engage (lock or clamp) and disengage (unlock or unclamp) the mounting bracket 1, the tilt bracket 2, and the middle jacket 3 for the tilt position adjustment and the telescopic position adjustment. A boss portion of a steering wheel is connected by serration to a rear end portion of the steering shaft 5.

The tilt bracket 2 is mainly operated for the tilt operation with respect to the mounting bracket 1 at the tilt position adjustment. Moreover, the tilt bracket 2 rotatably supports a front end side (portion) of the steering shaft 5. In this embodiment, the tilt bracket 2, the middle jacket 3, and the upper jacket 4 constitute a steering column surrounding the steering shaft 5.

As shown in FIG. 1 and FIG. 5, the mounting bracket 1 includes a pair of left and right side wall portions 1a and 1a; and a pair of front and rear stays 1b and 1c which are disposed to bridge between the side wall portions 1a and 1a (to connect the side wall portions 1a and 1a in a bridge manner), and which are welded to the side wall portions 1a and 1a. With these, the mounting bracket 1 has a substantially U-shaped shape which is opened in the downward direction when viewed from the front direction. The stays 1b and 1c include, respectively, mounting holes 71. The mounting bracket 1 is fixed to the vehicle body by bolts (not shown) inserted into the mounting holes 71 of the stays 1b and 1c, in an inclination posture in which the mounting bracket 1 is inclined so that a front end portion become lower. The stay 1b is positioned on a rear end side of the vehicle relative to the stay 1c.

Furthermore, as shown in FIG. 1 and FIG. 5, the mounting bracket 1 includes bearing holes 7 formed at front end portions of the side wall portions 1a. The mounting bracket 1 includes clamping piece portions 8 which are sandwiching (clamping) pieces, and which are formed at rear end portions of the side wall portions 1a.

Moreover, as shown in FIGS. 1, 4, 5, and 6, each of the clamping piece portions 8 includes a tilt elongated hole 10 which is a tilt hole, and which penetrates through the each of the clamping piece portions 8. Each of the tilt elongated holes 10c is an elongated hole having a center of curvature which is the bearing hole 7.

Furthermore, as shown in FIGS. 1, 4, 5, and 6, one of the clamping piece portions 8 includes a tongue piece portion 9 which serves as an easily shape varying portion, and which is surrounded by a slit that has a substantially U-shape directing in the transverse direction.

The slit 9a includes an upper side portion 72 which is positioned at upper position of the tilt elongated hole 10, and which extends in the forward and rearward directions; a lower side portion 73 which is positioned at lower position of the tilt elongated hole 10, and which extends in the forward and rearward directions; and a rear side portion 74 formed on a rear end side of the tilt elongated hole 10 so as to connect one ends of the upper side portion 72 and the lower side portion 73. The rear side portion 74 is formed to extend along an arc of the tilt elongated hole 10.

This slit 9a is formed into a transverse U-shape which is opened on the front side of the vehicle body. The rear side portion 74 of the slit 9a is formed into an arc shape having a center of curvature of the shaft hole 7. Besides, this rear side portion 74 may be an arc having larger radius. Moreover, the rear side portion 74 may be a linear shape.

As shown in FIGS. 1 and 6, a line connecting both ends of the slit 9a which is a base end 9b of the elastic shape variation is set to be similar to a direction of the arc of the tilt elongated hole 10 which is the tilt adjusting direction. With this, the tongue piece portion 9 can readily vary the shape thereof by the substantially identical operation force in a range of the elastic region thereof. Besides, the clamping piece portions 8 and 8 can vary the shapes thereof in a range of the elastic regions thereof.

The tilt elongated hole 10 of one of the clamping piece portions 8 is positioned at a tip end side of the tongue piece portion 9 (at the left side end in FIG. 6).

The tilt elongated hole 10 of the one of the clamping piece portions 8 is formed so that a distance between the base end 9b of the tongue piece portion 9 and the tilt elongated hole 10 of the one of the clamping piece portions 8 becomes substantially constant, irrespective of the tilt position. That is, the tilt elongated hole 10 of the one of the clamping piece portions 8 is formed so that the distance between the tilt elongated hole 10 of the one of the clamping piece portions 8 and the base end 9b of the tongue piece portion 9 in the longitudinal direction of the tilt elongated hole becomes substantially constant. In this case, the base end 9b of the tongue piece portion 9 is a portion which is a linear shape connecting a tip end of an upper side portion 72 of the slit 9a and a tip end of a lower side portion 73 of the slit 9a. This base end 9b is inclined along the curvature of the tilt elongated hole 10. The base end 9b is formed to be substantially parallel with the tilt elongated hole 10.

With this, the tilt elongated hole 10 is formed on the tip end side of the tongue piece portion 9. The easily shape varying portion is ensured between the tilt elongated hole 10 and the base end 9b of the tongue piece portion 9. Accordingly, it is possible to relatively decrease a spring constant of the tongue piece portion 9. That is, it is possible to relatively decrease the rigidity of the tongue piece portion 9.

Moreover, one of the clamp piece portions 8 including the slit 9a includes a reinforcement portion that surrounds the outside of the slit 9a, and that is integrally formed. This reinforcement portion includes a first flange portion 75, a second flange portion 76, a third flange portion 77, and a fourth flange portion 78 which are disposed, respectively, to surround the outside of the slit 9a in four directions. Each of the first to fourth flange portions 75, 76, 77, and 78 is formed to protrude in the side direction of the clamping piece portion 8. That is, each of the first to fourth flange portions 75, 76, 77, and 78 is formed to be perpendicular to the clamping piece portion 8.

The first flange portion 75 which is the front flange portion is positioned on a front side of the vehicle with respect to the slit 9a. The first flange portion 75 is formed to be adjacent to and confront an opening portion of the slit 9a, that is, the base end 9b of the tongue piece portion 9. That is, the first flange portion 75 is constituted by a portion formed by bending a portion of the front end portion of the stay 1b in the downward direction.

The second flange portion 76 which is an upper flange portion is positioned on the upper side of the vehicle with respect to the slit 9a. The second flange portion 76 is formed to be adjacent to and confront the upper side portion 72 of the slit 9a. That is, the second flange portion 76 is constituted by a portion of the stay 1b which protrudes from the side wall portion 1a in the outward direction, and in which the mounting hole 71 is formed. That is, the second flange portion 76 is integrally continuous with the first flange portion 75. Furthermore, the second flange portion 76 serves as the mounting flange for mounting the mounting bracket 1 to the vehicle body.

The third flange portion 77 which is a rear flange portion is positioned on the rear side of the vehicle with respect to the slit 9a. The third flange portion 77 is formed to be adjacent to and confront the rear side portion 74 of the slit 9a. That is, the third flange portion 77 is formed along a rear end edge of the side wall portion 1a which is a rear end edge of the clamping piece portion 8. The third flange portion 77 is constituted by integrally jointing, by welding, a portion formed by bending the outer circumference edge (the rear end edge) of the clamping piece portion 8 in the outward direction, and a portion formed by bending a portion of the rear end portion of the stay 1b in the downward direction. That is, the portion constituted by the stay 1b and the portion formed by bending the rear end edge (the outer circumference edge) of the side wall portion 1a are disposed to be superimposed with each other. These superimposed portions are welded along the overall length, so that the third flange portion 77 is formed. That is, the third flange portion 77 is integrally continuous with the first and second flange portions 75 and 76.

The fourth flange portion 78 which is the lower flange portion is positioned on the lower side of the vehicle with respect to the slit 9a. The fourth flange portion 78 is formed to be adjacent to and confront the lower side portion 73 of the slit 9a. That is, the fourth flange portion 78 is formed along the lower end edge of the side wall portion 1a which is the lower end edge of the clamping piece portion 8. The fourth flange portion 78 is constituted by a portion formed by bending the outer circumference edge (the lower end edge) of the clamping piece portion 8 in the outward direction. This fourth flange portion 78 is integrally continuous with the third flange portion 77.

As shown in FIG. 2, the first to fourth flange portions 75, 76, 77, and 78 are also provided to the clamping piece 8 which does not include the slit 9a.

Besides, in this embodiment, the stay 1b is joined to the pair of the side wall portions 1a and 1a by the welding. The first flange portion 75 and the second flange portion 76 are welded with the side wall portion 1a at the linear portion which are contacted on the side wall portion 1a over the overall length.

The tilt bracket 2 shown in FIG. 2 includes a pair of left and right side wall portions, and the lower wall portion 2a disposed between the pair of the left and right side wall portions. With this, the tilt bracket 2 has an upwardly opened U-shape which is opened on the upper surface. The tilt bracket 2 includes a bearing holder 11 which is disposed between the pair of the side wall portions at a front end portion of the tilt bracket 2, and which has a cylindrical shape having a flange. The tilt bracket 2 includes shaft holes 12 which are provided at front end portions of the side wall portions of the tilt bracket 2. Moreover, the tilt bracket 2 includes a second telescopic elongated hole 13 which serves for the telescopic position adjustment, which is formed in the lower wall portion 2a, and which extends in the forward and rearward directions. Furthermore, the tilt bracket 2 includes a pair of engagement piece portions 2b which are positioned at rear end portions of the side wall portions, and which extend from the side wall portions in the upward direction. Besides, the second telescopic elongated hole 13 is described later in detail.

As shown in FIG. 1 and FIG. 5, the tilt bracket 2 is assembled to be received within the U-shaped space of the mounting bracket 1. At this time, the shaft holes 12 of the tilt bracket 2 and the shaft holes 7 of the mounting bracket 1 are aligned with each other. In this state, the tilt hinge pin 14 serving as the tilt shaft is inserted into the shaft holes 12 and the shaft holes 7, so that the tilt bracket 2 and the mounting bracket 1 are fixed by the caulking. The tilt bracket 2 is supported on the mounting bracket 1 so as to be pivoted about the tilt hinge pin 14, that is, so as to adjust the tilt position. As described above, the upward opened U-shaped tilt bracket 2 is assembled within the downward opened U-shaped mounting bracket 1. With this, the superimposed portion between the tilt bracket 2 and the mounting bracket 1 has a substantially box shaped section.

Moreover, as shown in FIG. 1 to FIG. 3, assist springs 15 each of which is a helical extension spring are disposed, respectively, on outsides of the side wall portions of the tilt bracket 2. Each of the assist springs 15 includes an upper hook portion which is provided to the upper end portion of the assist spring 15, and which is retained by a retaining portion 16a of the mounting bracket 1; and a lower hook portion which is retained by a retaining portion 16b formed on one of the side wall portions of the tilt bracket 2. With this, the tilt bracket 2 whose the tilt position can be adjusted with respect to the mounting bracket 1 is constantly urged in the upward direction. That is, the tilt bracket 2 is constantly urged about the tilt hinge pin 14 in the counterclockwise direction of FIG. 2. With this, the dropping (detachment) of the steering column is prevented at the release of the engagement. Moreover, the operation force in the upper direction of the tilt is decreased.

The engagement piece portions 2b formed at the rear end portions of the both side wall portions of the tilt bracket 2 shown in FIG. 5 can elastically vary its shapes in the directions in which the engagement piece portions 2b are moved to be near each other, and to be apart from each other. Each of the engagement piece portions 2b includes an angle hole 2c having a substantially parallelogram shape.

The middle jacket 3 shown in FIGS. 1, 2, 4, and 5 includes a jacket main body 17 which has a rectangular cylindrical shape or a transformational octagonal cylindrical shape as described below; and a distance bracket 18 which serves as a distance section, and which is fixed on the upper surface of the jacket main body 17; and a front bracket 19 which has an upwardly opened U-shape, and which extends from the front end of the jacket main body 17.

The distance bracket 18 has the downwardly opened U-shaped shape which is opened on the lower surface the distance bracket 18. The distance bracket 18 is disposed to bridge the jacket main body 17. Lower end portions of the distance bracket 18 is fixed to the jacket main body 17 by welding and so on. In the middle jacket 3, the jacket main body 17 has the rectangular cylindrical shape or the transformational octagonal cylindrical shape. Moreover, the distance bracket 18 is fixed by the welding on the upper end surface side of the middle jacket 3, so that a portion between the middle jacket 3 and the jacket main body 17 has a box-shaped section. The both side wall portions of the distance bracket 18 are abutted and slid on the inner side surfaces of the tilt bracket 2. Each of the side wall portions of the distance bracket 18 includes a first telescopic elongated hole 20 which extends in the forward and rearward directions, and which serves as a guide at the telescopic position adjustment in the forward and rearward directions.

Moreover, as shown in FIG. 2 and FIG. 5, a column side telescopic lock teeth plate 21 is fixed on one of the side wall portions of the rectangular or the transformational octagonal shape jacket main body 17 of the middle jacket 3. The column side telescopic lock teeth plate 21 has lock teeth which has a shape like racks extending along in the forward and rearward directions. Furthermore, the middle jacket 3 is slidably disposed within an inside space between the mounting bracket 1 and the tilt bracket 2 which have the U-shapes, as described later. With this, it is possible to engage and hold the distance bracket 18 of the middle jacket 3 from the both sides by the clamping piece portions 8 of the mounting bracket 1 and the engagement piece portions 2b of the tilt bracket 2.

The upper jacket 4 shown in FIGS. 1, 2, 4, and 5 has a rectangular cylindrical shape or a transformational octagonal cylindrical shape which is similar to (analogous to) the jacket main body 17. The upper jacket 4 is slidably inserted through a linear bearing or a linear guide (cf. FIG. 7) into the jacket main body 17. Moreover, the upper shaft 5a of the steering shaft 5 is rotatably supported through the upper bearing 23 (cf. FIG. 4) on the upper jacket 4. The lower shaft 5b of the steering shaft 5 is connected to the upper shaft 5a by the serration mounting so as be moved with respect to the upper shaft 5 in the axial direction, and so as to rotate as a unit with the upper shaft 5a. Besides, the front end portion of the lower shaft 5b is rotatably supported through the lower bearing 24 (cf. FIG. 4) supported by the bearing holder 11 of the tilt bracket 2 of FIG. 5. For example, the front end portion of the lower shaft 5b is connected through a universal joint (coupling) or an intermediate shaft, to an input portion of the steering gear device (not shown).

As shown in FIGS. 1 and 2, the jacket main body 17 of the middle jacket 3 and the upper jacket 4 are relatively positioned in the axial direction. A shear pin (shearing pin) 25 made from a resin and so on is press-fitted in the pin holes formed in the side wall portions of the jacket main body 17 and the upper jacket 4 so as to bridge the both side wall portions. With this, the jacket main body 17 of the middle jacket 3 and the upper jacket 4 are fixed to each other. Besides, the shear pin 25 is arranged to connect the jacket main body 17 of the middle jacket 3 and the upper jacket 4 in the normal state so as to prevent the relative movement of the jacket main body 17 and the upper jacket 4. The shear pin 25 is arranged to be sheared when a load that is equal to or greater than a predetermined load is acted to the upper jacket 4 at the collision of the vehicle, so as to allow the relative movement of the jacket main body 17 and the upper jacket 4.

As described above, the steering column constituted by the tilt bracket 2, the middle jacket 3, the upper jacket 4, and the steering shaft 5 is swung about the tilt hinge pin 14 so as to adjust the tilt position. On the other hand, the middle jacket 3 and the tilt bracket 2 are relatively moved to each other so as to adjust the telescopic position.

The lock mechanism 6 shown in FIG. 5 includes a lock bolt 26 which is a clamp shaft, a stroke guide 27, an operation lever 28 including a handle (handgrip) portion 28 extending in the rearward direction, a ride-on cam member 29 and a profile cam member 30, a teeth connection plate 31, spring members 32 and 33 which are plate springs for the tilt lock and the telescopic lock, a lever side tilt lock teeth plate 34, a fixed side tilt lock teeth plate 35 confronting the lever side tilt lock teeth plate 34, the lever side telescopic lock teeth plate 36, and so on. The fixed side tilt lock teeth plate 35 is fixed to one of the clamping piece portions 8. The fixed side tilt lock teeth plate 35 includes a tilt elongated hole.

The stroke guide 27 shown in FIG. 5 penetrates through the tilt elongated hole 10 of the one of the clamping piece portions 8, and the rectangular hole 2c formed in one of the engagement piece portions 2b of the tilt bracket 2. The stroke guide 27 is mounted within the first telescopic elongated hole 20 formed in the distance bracket 18 of the middle jacket 3 so as to be slid within the first telescopic elongated hole 20 in the forward and rearward directions, and so as to restrict the rotation of the stroke guide 27. The ride-on cam member 29 is mounted and held in the rectangular hole of the operation lever 28 which has a substantially parallelogram shape so as not to be rotated. The teeth connection plate 31, the spring member 32, and the lever side tilt lock teeth plate 34 are mounted and supported on the angular column portion of the profile cam member 30 so as not to be rotated. That angular column portion of the profile cam member 30 penetrates through the angular hole 2c formed in the other of the engagement piece portions 2b of the tilt bracket 2. The angular column portion of the profile cam member 30 is mounted and held in the first telescopic elongated hole 20 formed in the distance bracket 18 of the middle jacket 3 so as to be moved in the forward and rearward directions, and so as not to be rotated. The lever side telescopic lock teeth plate 36 includes a rectangular column portion. The spring member 33 for the telescopic movement is mounted on this rectangular column portion of the lever side telescopic lock teeth plate 36 so as to restrict the rotation of the spring member 33. The spring member 33 is held in the lower rectangular hole of the teeth connection plate 31 to be slid in the axial direction of the rectangular hole in a state where the rotation of the spring member 33 is restricted. A snap ring 37 prevents the spring member 33 from dropping off.

In a state where the middle jacket 3 and the tilt bracket 2 are received and assembled within the U-shaped space of the downwardly opened U-shaped bracket 1, the lock bolt 26 is inserted into the stroke guide 27 mounted and held in the rectangular hole 2c of the tilt bracket 2, the first telescopic elongated hole 20 formed in the distance bracket 18, the fixed side tilt lock teeth plate 35, the lever side tilt lock teeth plate 34, the spring member 32 for the tilt lock, the teeth connection plate 31, the profile cam member 30 mounted and held in the rectangular hole 2c of the tilt bracket 2, and the ride-on cam member 29 mounted and held in the rectangular hole of the operation lever 28. A nut 39 is tightened through a bearing (thrust needle bearing) 38 from the operation lever 28's side, so as to prevent the detachment.

With this, as described above, the stroke guide 27 is slidably mounted and held in the first telescopic elongated hole 20 formed in the one of the side wall portions of the distance bracket 18 of the middle jacket 3. The rectangular column portion of the profile cam member 30 is slidably mounted and held in the first telescopic elongated hole 20 formed in the other of the side wall portions of the distance bracket 18 of the middle jacket 3.

Each of the fixed side tilt lock teeth plate 35 and the lever side lock teeth plate 34 includes saw-like lock teeth which are formed on a confronting surface of the each of the fixed side tilt lock teeth plate 35 and the lever side lock teeth plate 34 on which the fixed side tilt lock teeth plate 35 and the lever side lock teeth plate 34 confront each other. The lever side tilt lock teeth plate 34 is arranged to be moved toward or apart from the fixed side tilt lock teeth plate 35 in accordance with the rotation operation of the operation lever 28, and thereby to be engaged with and disengaged (released) from the fixed side tilt lock teeth plate 35. The lever side tilt lock teeth plate 34 and the fixed side tilt lock teeth plate 35 are arranged to lock and unlock the tilt position adjustment. Moreover, as shown in FIG. 2, the lever side telescopic teeth plate 36 confronts the fixed side telescopic lock teeth plate 21 of the middle jacket 3 from the opening window portion 40 of the tilt bracket 2. These fixed side telescopic lock teeth plate 21 and the lever side telescopic lock teeth plate 36 have a function to lock and unlock the telescopic position adjustment, like the relationship between the fixed side tilt lock teeth plate 35 and the lever side tilt lock teeth plate 34.

In this case, the telescopic position adjustment is performed in a range of the first telescopic elongated holes 20 formed in the distance bracket 18 of the middle jacket 3. Moreover, the lower wall portion 2a of the tilt bracket 2 includes a second telescopic elongated hole 13 for the telescopic position adjustment, as shown in FIG. 5.

Figure 7:
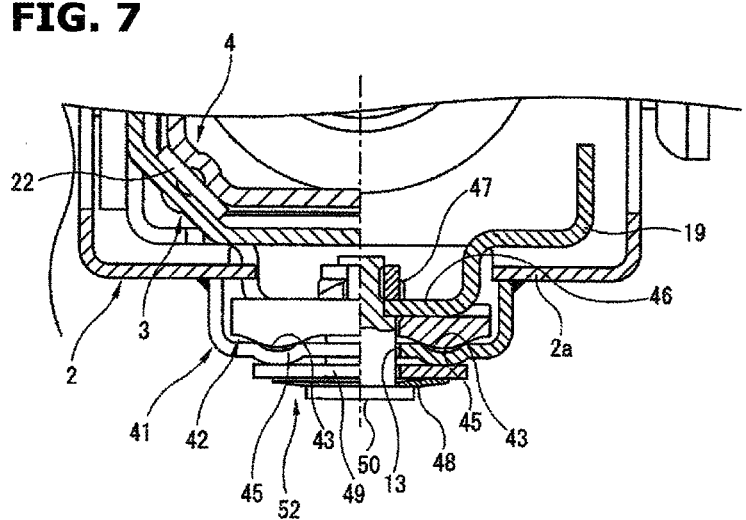
FIG. 7 is a sectional explanation view showing an enlarged main part of FIG. 3.
Figure 8A:
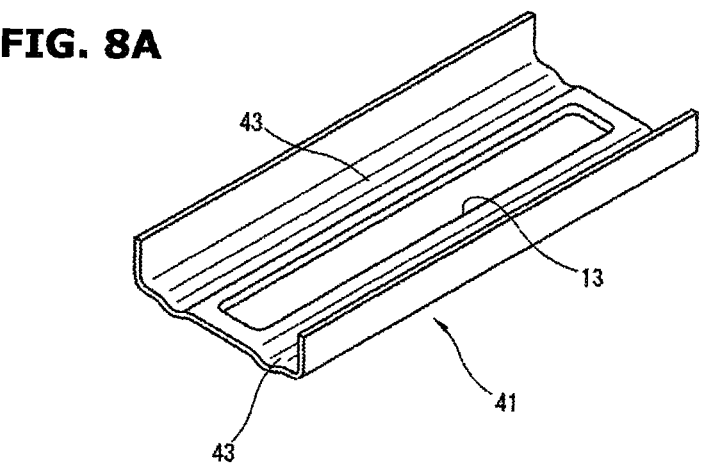
FIG. 8A is a perspective view showing a bottom bracket shown in FIG. 7.
Figure 8B:
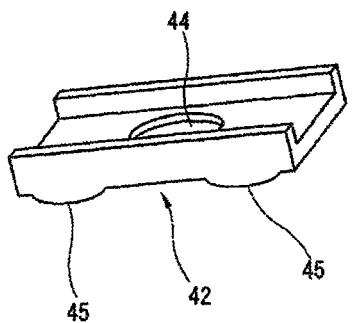
FIG. 8B is a perspective view showing a slider shown in FIG. 7.

FIG. 7 shows a sectional view in which the main portion of FIG. 3 is enlarged. As shown in FIGS. 1, 2, 4, and 7, the bottom bracket 41 is fixed on the lower wall portion 2a of the tilt bracket 2 by the welding so as to protrude in the downward direction. As shown in FIG. 8A, this bottom bracket 41 has a flat shape and an upwardly opened U-shaped section. A slider 42 shown in FIG. 8B is disposed on the bracket 41 to be superposed on the bracket 41. The slider 42 is a slider member made from a resin. Besides, in FIG. 7, different cross sections are combined to form FIG. 7 for easing the understanding at these portions.

Moreover, as shown in FIG. 4, the front end portion of the front bracket 19 of the middle jacket 3 is disposed on the slider 42 to be superimposed on the slider 42, as described later. Furthermore, the bottom bracket 41 shown in FIG. 8A includes a second telescopic elongated hole 13. Moreover, the bottom bracket 41 includes guide grooves 43 each of which has an arc section, which are formed on both sides of the second telescopic elongated hole 13 to sandwich the second telescopic elongated hole 13, which extend in parallel with each other near the second telescopic elongated hole 13, and each of which includes an upper surface that is recessed in the downward direction. This second telescopic elongated hole 13 is positioned on the front side of the first telescopic elongated holes 20 formed in the distance bracket 18 of the middle jacket 3 shown in FIG. 5.

On the other hand, the slider 42 shown in FIG. 8B includes a mounting hole 44 penetrating through the slider 42. The slider 42 includes protruding portions 45 each of which has an arc section, each of which has a downwardly raised shape, which are formed on the both sides of the mounting hole 44 at positions corresponding to the guide grooves 43 of the bottom bracket 41 shown in FIG. 8A.

Moreover, as shown in FIGS. 7 and 8, when the bottom bracket 41 and the slider 42 are superimposed on each other, the mounting hole 44 of the slider 42 is aligned with the second telescopic elongated hole 13 of the bottom bracket 41. Furthermore, the protruding portions of the slider 42 are aligned with the guide grooves 43 of the bottom bracket 41. In this case, the surface of each of the guide grooves 43 on which one of the protruding portions 45 of the slider 42 is contacted has a radius of curvature smaller than a radius of curvature of the one of the protruding portions 45, so that each of the protruding portions 45 of the slider 42 is contacted on one of the guide grooves 43 of the bottom bracket 41 by the line contact in the longitudinal direction.

Figure 9A:
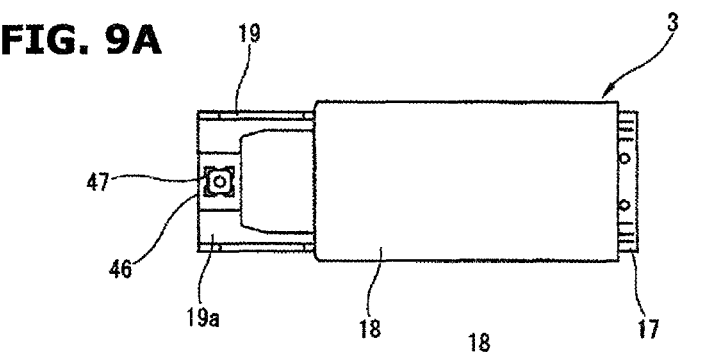
FIGS. 9A to 9C are views showing a distance bracket shown in FIG. 5.
Figure 9B:
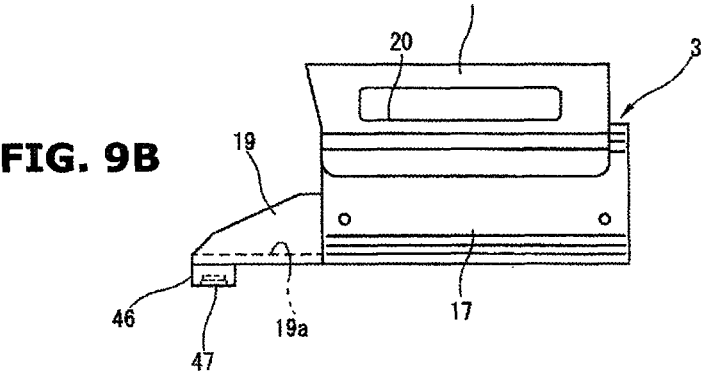
Figure 9C:
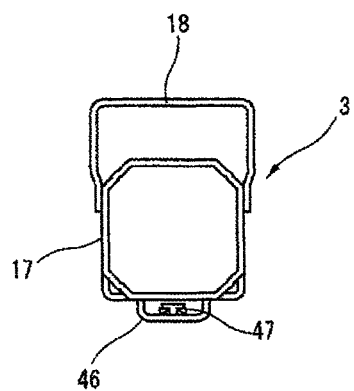

FIGS. 9A, 9B, and 9C show the only middle jacket 3 described above. FIG. 9A is a plan view. FIG. 9B is a front view of FIG. 9A. FIG. 9C is a left side view of FIG. 9B. The substantially upwardly opened U-shaped front bracket 19 is welded and fixed on the front end of the jacket main body 17 so as to elongate this front end of the jacket main body 17. This bottom wall portion 19a of this front bracket 19 includes a seat flange portion 46 which has a substantially upwardly opened U-shape, which protrudes toward the tilt bracket 2, which confront the bottom bracket 41, and which is a seat portion of the slider 42. A nut (projection nut) 47 is welded and fixed on this seat flange portion 46. Besides, the bottom wall portion 19a of the front bracket 19 is integrated with the bottom wall portion of the jacket main body 17 of the middle jacket 3 as a part of the bottom wall of the jacket main body 17.

Figure 10:
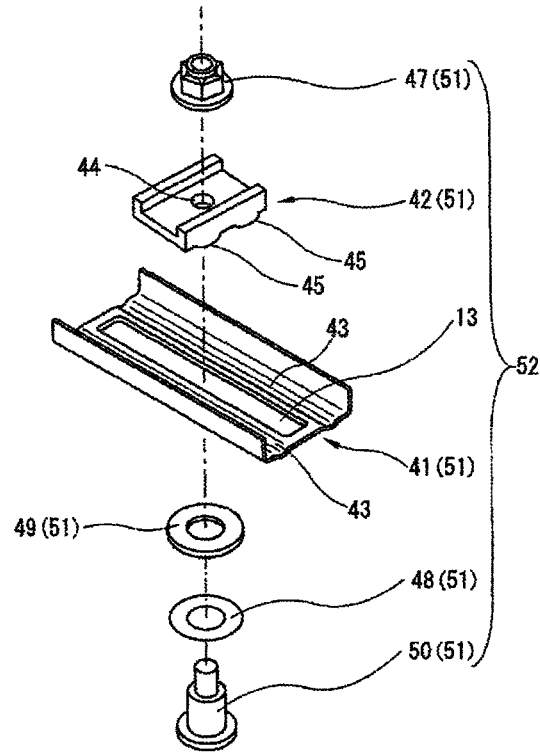
FIG. 10 is an exploded perspective view showing a main part of FIG. 7.
Figure 11:
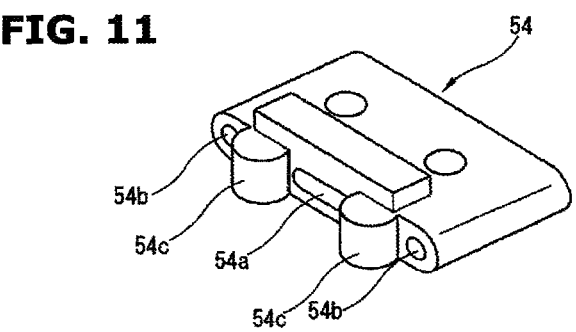
FIG. 11 is a perspective view showing a wire holder shown in FIG. 5.

FIG. 10 is an exploded view showing a relationship between the bottom bracket 41, the slider 42, and the nut 47 of the front bracket 19. In FIG. 10, the front bracket 19 is omitted.

As shown in FIG. 7 and FIG. 10, the bolt 50 which is a tightening member having a stepped shape is inserted from the lower side of the bottom bracket 41 through a disk spring 48 that is an elastic member, and a washer 49, into the second telescopic elongated hole 13 and the mounting hole 44 of the slider 42. This bolt 50 is tightened into the nut 47 which is the tightening member, and which is fixed and welded on the seat flange portion 46 of the front bracket 19. With this, the bottom bracket 41 including the second telescopic elongated hole 13, the slider 42, and the seat flange portion 46 of the front bracket 19 are elastically tightened together. With this, as shown in FIG. 7, the bottom bracket 41 and the washer 49 are contacted on two portions on the back surface side of the guide grooves 43 by the line contacts. Moreover, the guide grooves 43 of the bottom bracket 41 and the protruding portions 45 of the slider 42 are pressed and contacted on each other. Accordingly, each of the protruding portions 45 is contacted at the two portions of one of the guide grooves 43 by the line contacts.

With these structure, for the telescopic position adjustment, the middle jacket 3 and the slider 42 are supported on the bottom bracket 41 of the tilt bracket 2 to be slid with respect to the bottom bracket 41 of the tilt bracket 2. The bottom bracket 41, the slider 42, and the seat flange portion 46 of the front bracket 19 are elastically tightened together. With this, the backlash in the upward and downward directions and in the leftward and rightward directions of FIG. 7 is not generated.

As explained above, the sliding guide member 51 provided to the middle jacket 3 for the telescopic position adjustment is constituted by the slider 42 which is the sliding member sandwiched between the bottom bracket 41 of the tilt bracket 2 and the front bracket 19 of the middle jacket 3, the disc spring 48, the washer 42, the bolt 50, and the nut 47 which elastically tighten that slider 42 between the bottom bracket 41 and the front bracket 19. Moreover, the telescopic guide mechanism 52 is constituted by this sliding guide member 51, and the second telescopic elongated hole 13 of the bottom bracket 41.

As shown in FIGS. 4 and 5, an energy absorption wire (hereinafter, referred to as wire) 53 is disposed on an upper surface of the jacket main body 17 of the middle jacket 3. The wire 53 is arranged to absorb the energy at the collision. This wire 53 is bent into a flat W-shape or a flat M-shape. The wire 53 includes a front bending base portion 53a positioned on the front end side, and free end portions 53c positioned on the both sides of the front bending base portion 53a, and rear bending base portions 53b positioned on the rear end side. The front bending base portion 53a and the free end portions 53c are inserted, respectively, into wire insertion holes 54a and 54b of the wire guide 54 which is a guide member shown in FIG. 11. Then, this wire 53 and the wire guide 54 are fixed on the upper surface of the jacket main body 17 by two screws 55. Then, the front bending base portion 53a of the wire 53 is retained on a retaining portion 56 formed on the upper surface of the front end of the upper jacket 4 to protrude from the upper surface of the front end of the upper jacket 4, as shown in FIG. 4. On the other hand, the pair of the rear bending base portions 53b of the wire 53 are wound, respectively, around guide surfaces of semicircular cylindrical guide protruding portions 54c of the wire guide 54 shown in FIG. 11.

In the above-described structure, when the load is acted to the steering column through the steering wheel and the steering shaft 5 to compress the steering column at the secondary collision due to the collision of the vehicle, the shear pin 25 shown in FIGS. 1 and 2 is sheared. Then, the upper jacket 4 is compressed (constricted) through the linear guide 22 with respect to the jacket main body 17 of the middle jacket 3. At this time, the wire 53 retained on the retaining portion 56 of the upper jacket 4 shown in FIG. 4 is pulled out. That wire 53 is continuously deformed along the guiding surfaces of the guide protruding portions 54c, so as to absorb the collision energy. Besides, the retaining portion 56 is inserted into the slit 17a of the jacket main body 17 shown in FIG. 4. Accordingly, the retaining portion 56 does not interfere with the assembly operation of the upper jacket 4 and the jacket main body 17.

Hereinafter, in the thus-constructed steering column device, the tilt position adjustment operation and the telescopic position adjustment operation are explained.

As shown in FIGS. 1 and 2, in the lock state, the hand grip portion 28a of the operation lever 28 extends substantially parallel to the steering column. In this lock state, cam ridges of the ride-on cam member 29 rides on cam ridges of the profile cam member 30. The tilt position adjustment function and the telescopic position adjustment function of the steering column are in the lock state.

That is, the cam ridges of the ride-on cam member 29 and the profile cam member 30 rides on each other. Accordingly, the lock bolt 26 is pulled on the operation lever 28's side in the axial direction of the lock bolt 26, so that the distance between the stroke guide 27, the teeth connection plate 31, and the profile cam member 30 is decreased. With this, the pair of the clamping piece portions 8 of the mounting bracket 1 which are positioned on the outermost positions, the pair of the engagement piece portions 2b of the tilt bracket 2 and the distance bracket 18 of the middle jacket 3 which are positioned inside the clamping piece portions 8 are engaged in the axial direction of the lock bolt 26. At the same time, the lock teeth of the lever side tilt lock teeth plate 34 shown in FIG. 5 is engaged with the lock teeth of the fixed side tilt lock teeth plate 35 of one of the clamping piece portions 8 of the mounting bracket 1. Furthermore, the lock teeth of the lever side telescopic lock teeth plate 36 is pressed by the teeth connection plate 31 through the spring 33. With this, the lock teeth of the lever side telescopic lock teeth plate 36 is engaged with the lock teeth of the column side telescopic lock teeth plate 21 which are provided on the side surface of the middle jacket 3.

Besides, even in a case where the lock teeth of the lock teeth plates 34 and 36 which are the lever side, and the lock teeth of the lock teeth plates 35 and 21 which are the fixed side or the column side are in the teeth tip lock state where these are connected with each other at the teeth tips, the spring members 32 and 33 which urge the lock teeth plates 34 and 36 that are the lever side are elastically deformed, so that the clamping piece portion 8 and the teeth connection plate 31 are pressed and contacted on each other. Accordingly, it is possible to lock the steering column device, irrespective of the shaft force generated in the lock bolt 26.

With this, the tilt bracket 2 is locked so as to unable the tilt position adjustment with respect to the mounting bracket 1. Moreover, the middle jacket 3 is locked so as to unable the telescopic position adjustment with respect to the mounting bracket 1.

On the other hand, the hand grip portion 28a of the operation lever 28 shown in FIGS. 1 and 2 is operated to be pivoted a predetermined amount in the downward direction at the tilt position adjustment (the position adjustment in the upward and downward directions of the vehicle) or the telescopic position adjustment (the position adjustment in the forward and rearward directions of the vehicle). By this pivot operation of the operation lever 28 in the downward direction, the cam ridge of the ride-on cam member 29 shown in FIG. 5 falls in the groove portion between the cam ridges of the profile cam member 30 which is the counterpart side. The pulling shaft force of the lock bolt 26 is decreased so as to release the engagement holding force which is (has been) acted to the clamping piece portion 8 of the mounting bracket 1 and so. With this, the steering column is brought to the unlock state.

In this case, the spring member 32 is arranged to urge the tilt lock teeth plate 35 which is the column side, in the lock direction, and to release the tilt lock teeth plate 35 in the unlock direction. In the unlock state, the tilt lock teeth plate 34 which is the lever side is maintained by the spring member 32 in a state where the tilt lock teeth plate 34 is released from the fixed side tilt lock teeth plate 35 which is the counterpart. Moreover, at this time, the teeth connection plate 31 is simultaneously moved in the unlock direction. The lever side telescopic lock teeth plate 36 is maintained in a state where the lever side telescopic lock teeth plate 36 is released from the column side telescopic lock teeth plate 21 which is the counterpart side.

In this unlock state, the tilt bracket 2 is operated to be pivoted about the tilt hinge pin 14 in the upward and downward directions of the vehicle (in a direction shown by an arrow in FIG. 2). With this, it is possible to adjust the position of the steering column so as to operate the tilt bracket 2, the middle jacket 3, and the upper jacket 4 as a unit with one another. With this, it is possible to perform the tilt position adjustment (the position adjustment in the upward and downward directions of the vehicle) within a range of the tilt elongated holes 10 formed in the pair of the clamping piece portions 8 of the mounting bracket 1 and the tilt elongated hole of the fixed side tilt lock teeth plate 35.

Moreover, in the unlock state, the upper jacket 4 and the middle jacket 3 is moved in the forward and rearward directions of the vehicle (in a direction shown by b in FIG. 2). With this, it is possible to perform the telescopic position adjustment (the position adjustment in the forward and rearward directions of the vehicle) within a range of the first telescopic elongated holes 20 formed in the distance bracket 18 of the middle jacket 3, and the second telescopic elongated hole 13 formed in the bottom bracket 41 of the tilt bracket 2, as shown in FIG. 5. In this case, the lock bolt 26 is inserted into the first telescopic elongated holes 20. Accordingly, the lock bolt 26 is not interfered with the telescopic position adjustment.

By operating the operation lever 28 to be pivoted again in the upward direction to the position of FIGS. 1 and 2 after the tilt position adjustment and the telescopic position adjustment, the steering column device is returned to the prior lock state.

In the thus-constructed steering column device, when the tilt position is fixed to a desired position, the tongue piece portion 9 of the clamping piece portion 8 is deformed by the lock mechanism 6 to sandwich the tilt bracket 2. At this time, the tongue piece portion 9 is deformed about the base end 9*b* which is a linear portion connecting the tip end of the upper side portion 72 and the tip end of the lower end portion 73, irrespective of the position of the tilt position. That is, the tongue piece portion 9 has a configuration similar to a cantilever beam which uses the base end 9*b* as a fixed end. In this case, a distance between the axis of the lock bolt 26 and the base end 9*b* is substantially constant at any position of the tilt elongated hold 10. Accordingly, the variation of the operation force according to the tilt position when the tongue piece portion 9 of the clamping piece portion 8 is tightened by the lock mechanism 6 becomes small. Consequently, in the steering column device, it is possible to stabilize the operability when the tilt position is fixed by the lock mechanism 6.

Moreover, the tongue piece portion 9 can be elastically deformed in the axial direction of the lock bolt 26 by the light force, by providing the slit 9*a*. Accordingly, in the steering column device, the operation force when the lock mechanism 6 is operated becomes relatively small.

The tongue piece portion 9 has the low rigidity to be flexible. Accordingly, the loss of the shaft force when the tongue piece portion 9 of the clamping piece portion 8 is tightened by the lock mechanism 6 becomes small. It is possible to surely hold the tilt bracket 2.

Accordingly, even when the other of the clamping piece portions 8 which has no slit 9*a* has the large rigidity, it is possible to decrease the operation force while ensuring the shaft force for the lock. With this, it is possible to improve the support rigidity, and to decrease and stabilize the operation force.

Moreover, in the clamping piece portion 8 including the slit 9*a*, the shape of the tongue piece portion 9 is readily varied. On the other hand, the entire rigidity is improved by the first to fourth flange portions 75, 76, 77, and 78 which are provided to surround the outside of the slit 9*a*. Moreover, in the clamping piece portion 8 including the slit 9*a*, the rigidity of the portion around the slit 9*a* can be improved by the first to fourth flange portions 75, 76, 77, and 78. In particular, the first flange portion 75 is disposed adjacent to the base end 9*b* of the tongue piece portion 9 of the first flange portion 75. With this, in the clamping piece portion 8 including the slit 9*a*, the rigidity of the portion around the base end 9*b* of the tongue piece portion 9 is improved. It is possible to suppress the deformation of this portion.

With this, in the clamping piece portion 8 including the slit 9*a*, it is possible to improve the rigidity, and to further improve the rigidity of the entire of the steering column device.

Moreover, the tilt elongated hole 10 is formed so that the distance between the tilt elongated hole 10 and the base end 9*b* of the tongue piece portion 9 becomes substantially constant, irrespective of the tilt position. For example, the distance (shortest distance) between the lock bolt 26 and the base end 9*b* of the tongue piece portion 9 at the tilt uppermost position (upper limit position) can be substantially identical to the distance (shortest distance) between the lock bolt 26 and the base end 9*b* of the tongue piece portion 9 at the tilt lowermost position (lower limit position). That is, it is possible to uniformize the operation force when the tongue piece portion 9 of the clamping piece portion 8 is tightened by the lock mechanism 6, independently of the tilt position.

Moreover, the slit 9*a* has the U-shape opened on the front side of the vehicle. Accordingly, the tilt elongated hole 10 is positioned on the relatively rear side of the vehicle. Consequently, it is possible to relatively improve the vibration rigidity of the steering column device.

Furthermore, the above-described mounting bracket 1 in this embodiment has a structure in which the portion that includes the shaft hole 7, and that is on the front side of the vehicle, and the clamping piece portion 8 that including the tilt elongated hole 10, and which is on the rear side of the vehicle are integrated with each other. However, the mounting bracket 1 may has a two divided structure in which the mounting bracket 1 is divided to two sections on the front and rear sides of the vehicle. That is, the mounting bracket 1 can be divided into the front side mounting bracket including the stay 1*c* and the shaft hole 7, and the rear side mounting bracket including the stay 1*b*, the clamping piece portion 8, and the tilt elongated hole 10.

Moreover, in the above-described embodiment, the slit 9*a* is formed in the clamping piece portion 8 positioned on the side on which the operation lever 28 of the lock mechanism 6 is not provided. However, the slit 9*a* may be formed in the clamping piece portion 8 positioned on the side on which the operation lever 28 of the lock mechanism 6 is provided.

The flange portion 75 may be formed so that the lower end portion of the flange portion 75 is integrally continuous with the fourth flange portion 78.

In the above-described embodiment, all or a part of the third flange portion 77 and the fourth flange portion 78 may be omitted as long as the necessary rigidity can be obtained. That is, the only first flange portion 75 and the second flange portion 76 may be provided around the slit 9*a*. The only first to third flanges 75, 76, and 77 may be provided around the slit 9*a*.

Furthermore, the first to fourth flange portions 75, 76, 77, and 78 need not to be integrally continuous with each other as long as the necessary rigidity can be obtained. For example, the upper end of the first flange portion 75 may be apart from the second flange portion 76. However, in a case where the flanges are integrally continuous with one another, the rigidity becomes higher than the other cases.

The slit 9*a* can be formed into a U-shape opened on the rear side of the vehicle, contrary to the above-described embodiment. In this case, the position at which the tilt bracket 2 are clamped becomes the relatively front side of the vehicle.

In the present invention, a steering column device includes: a steering shaft; a steering column arranged to rotatably support the steering shaft; a vehicle body mounting bracket arranged to rotatably support the steering column to be swung in upward and downward directions of a vehicle about a tilt shaft of a swing center which is provided to a front end portion of the steering column; a pair of clamping pieces which are integrally provided to the vehicle body mounting bracket, and which are disposed to sandwich the steering column from both sides of the steering column on a rear end portion of the steering column; tilt holes each of which is formed in one of the clamping pieces, and each of which has an arc shape around the tilt shaft; a clamping shaft penetrating through the tilt holes and the steering column; and a lock mechanism provided to one end portion of the clamping shaft, and arranged to tighten and engage the steering column by the pair of the clamping pieces, one of the pair of the clamping pieces including a slit which has a substantially U-shape, and which surrounds one of a front side and a rear side of the tilt hole, and an upper side and a lower side of the tilt hole, and a tongue piece portion which is surrounded by the slit, the tilt hole being positioned at a tip end side of the tongue piece portion, and at least the one of the clamping pieces including the slit, including a reinforcement portion which surrounds an outside of the slit, and which is integrally provided with the one of the clamping pieces including the slit.

In the thus-constructed steering column device, when the tilt position is fixed to a desired position, the tongue piece portion of the clamping piece portion is deformed by the lock mechanism 6 to sandwich the tilt bracket 2. At this time, the tongue piece portion is deformed about the base end which is a linear portion connecting the both ends of the substantially U-shaped slit, irrespective of the tilt position. Accordingly, the variation of the operation force according to the tilt position when the tongue piece portion of the clamping piece portion is tightened by the lock mechanism becomes small.

Moreover, the reinforcement portion is constituted by an upper flange portion which is disposed on the upper side of the slit, a lower flange portion which is disposed on the lower side of the slit, a front flange portion which is disposed on the front side of the slit, and a rear flange portion which is disposed on the rear side of the slit.

Furthermore, the vehicle body mounting bracket includes the pair of the clamping pieces, and a stay which is positioned on the upper side of the pair of the clamping pieces, and which includes a mounting hole for mounting to the vehicle body; the upper flange portion, the front flange portion, and the rear flange portion are constituted by bending a part of front and rear end portions of the stay in a downward direction; and the upper flange portion, the front flange portion, and the rear flange portion are a continuous shape which surrounds the upper side of the slit, the front side of the slit, and the rear side of the slit.

Moreover, the lower flange portion of the reinforcement portion is formed to be integrally continuous with the rear flange portion of the reinforcement portion.

Furthermore, the slit has a substantially U-shape opened on the front side of the vehicle.

The steering column device according to the present invention includes the tongue piece portion which is formed in one of the clamping pieces clamping the steering column, which has a substantially U-shape, and which surrounds the slit. With this, it is possible to increase the rigidity of the clamping piece by the reinforcement portion, and thereby to improve the support rigidity. Moreover, the shape of the tongue piece portion is readily varied in the axial direction of the clamping shaft. Accordingly, it is possible to decrease the rigidity. With this, the steering column device makes it possible to improve the support rigidity, and to relatively decrease the operation force when the lock mechanism is operated.

Moreover, the operation force for tightening the tongue piece portion by the lock mechanism is not varied, irrespective of the tilt position. Accordingly, it is possible to stable the operation force.

The entire contents of Japanese Patent Application No. 2016-72579 filed Mar. 31, 2016 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A steering column device comprising:
a steering shaft;
a steering column arranged to rotatably support the steering shaft;
a vehicle body mounting bracket arranged to rotatably support the steering column to be swung in upward and downward directions of a vehicle about a tilt shaft of a swing center which is provided to a front end portion of the steering column;
a pair of clamping pieces which are integrally provided to the vehicle body mounting bracket, and which are disposed to sandwich the steering column from both sides of the steering column on a rear end portion of the steering column;
tilt holes each of which is formed in one of the clamping pieces, and each of which has an arc shape around the tilt shaft;
a clamping shaft penetrating through the tilt holes and the steering column; and
a lock mechanism provided to one end portion of the clamping shaft, and arranged to tighten and engage the steering column by the pair of the clamping pieces,
one of the pair of the clamping pieces including a slit which has a substantially U-shape, and which surrounds one of a front side and a rear side of the tilt hole, and an upper side and a lower side of the tilt hole, and a tongue piece portion which is surrounded by the slit, the tilt hole being positioned at a tip end side of the tongue piece portion, and
at least the one of the clamping pieces including the slit, including a reinforcement portion which surrounds an outside of the slit, and which is integrally provided with the one of the clamping pieces including the slit.

2. The steering column device as claimed in claim 1, wherein the reinforcement portion is constituted by an upper flange portion which is disposed on the upper side of the slit, a lower flange portion which is disposed on the lower side of the slit, a front flange portion which is disposed on the front side of the slit, and a rear flange portion which is disposed on the rear side of the slit.

3. The steering column device as claimed in claim 2, wherein the vehicle body mounting bracket includes the pair of the clamping pieces, and a stay which is positioned on the upper side of the pair of the clamping pieces, and which includes a mounting hole for mounting to the vehicle body; the upper flange portion, the front flange portion, and the rear flange portion are constituted by bending a part of front and rear end portions of the stay in a downward direction; and the upper flange portion, the front flange portion, and the rear flange portion are a continuous shape which surrounds the upper side of the slit, the front side of the slit, and the rear side of the slit.

4. The steering column device as claimed in claim 2, wherein the lower flange portion of the reinforcement portion is formed to be integrally continuous with the rear flange portion of the reinforcement portion.

5. The steering column device as claimed in claim 1, wherein the slit has a substantially U-shape opened on the front side of the vehicle.

* * * * *